United States Patent
Yoshimura et al.

(10) Patent No.: US 9,918,059 B2
(45) Date of Patent: *Mar. 13, 2018

(54) IMAGE DISPLAY APPARATUS AND IMAGE ADJUSTMENT METHOD OF IMAGE DISPLAY APPARATUS

(71) Applicant: SEIKO EPSON CORPORATION, Tokyo (JP)

(72) Inventors: Jun Yoshimura, Beppu (JP); Makoto Kobayashi, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 212 days.

This patent is subject to a terminal disclaimer.

(21) Appl. No.: 15/018,369

(22) Filed: Feb. 8, 2016

(65) Prior Publication Data

US 2016/0156890 A1   Jun. 2, 2016

Related U.S. Application Data

(63) Continuation of application No. 14/013,477, filed on Aug. 29, 2013, now Pat. No. 9,280,809.

(30) Foreign Application Priority Data

Oct. 2, 2012 (JP) .................................. 2012-220251

(51) Int. Cl.
G09G 5/00 (2006.01)
H04N 9/31 (2006.01)
G06T 5/00 (2006.01)

(52) U.S. Cl.
CPC ........... *H04N 9/3191* (2013.01); *G06T 5/006* (2013.01); *H04N 9/3135* (2013.01); *H04N 9/3185* (2013.01); *H04N 9/3197* (2013.01)

(58) Field of Classification Search
CPC .. H04N 9/3185; H04N 9/3135; H04N 9/3191; H04N 9/3197; G06T 5/006; G09G 3/002
See application file for complete search history.

(56) References Cited

U.S. PATENT DOCUMENTS 6,281,950 B1   8/2001   Webb et al.
7,104,653 B2   9/2006   Moriwaki et al.
(Continued)

FOREIGN PATENT DOCUMENTS

JP   2004228619 A   8/2004
JP   2004247978 A   9/2004
(Continued)

OTHER PUBLICATIONS

Sep. 15, 2015 Office Action issued in U.S. Appl. No. 14/013,477.

*Primary Examiner* — Weiming He
(74) *Attorney, Agent, or Firm* — Oliff PLC

(57) ABSTRACT

An image display apparatus includes an OSD processing section that displays a test pattern, which includes a plurality of index lines arranged in one of horizontal and vertical directions with respect to a pixel area of a liquid crystal light valve at regular intervals, in the pixel area, an input operation section that sets at least one of the plurality of index lines as a reference index line, and adjusts the intervals of the index lines of the test pattern so as to increase or decrease as a distance from the reference index line increases with respect to the direction of the arrangement of the index lines taking the reference index line as a reference, and an image correction section that corrects linearity of the image based on the intervals of the index lines adjusted by the input operation section.

6 Claims, 9 Drawing Sheets

(56) References Cited

U.S. PATENT DOCUMENTS

| | | |
|---|---|---|
| 7,492,495 B2 | 2/2009 | Ishihara et al. |
| 2006/0002604 A1 | 1/2006 | Sakai et al. |
| 2009/0213130 A1 | 8/2009 | Onodera et al. |

FOREIGN PATENT DOCUMENTS

| | | |
|---|---|---|
| JP | 2004-320662 A | 11/2004 |
| JP | 2007-199251 A | 8/2007 |

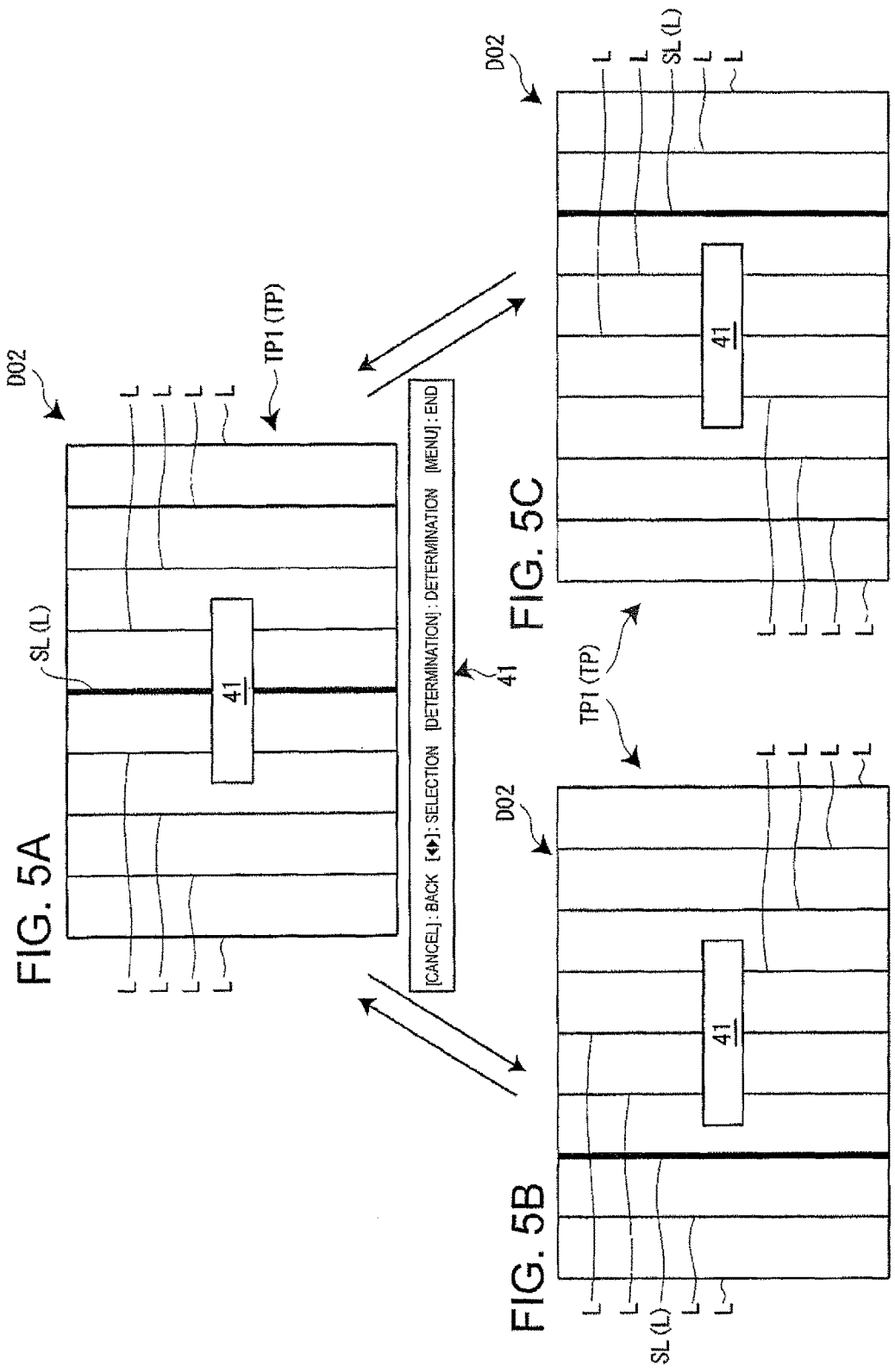

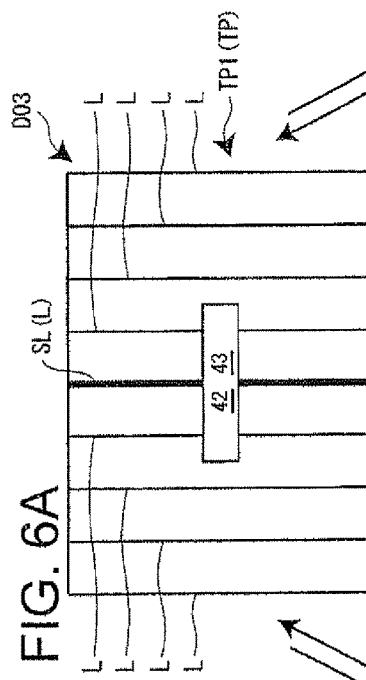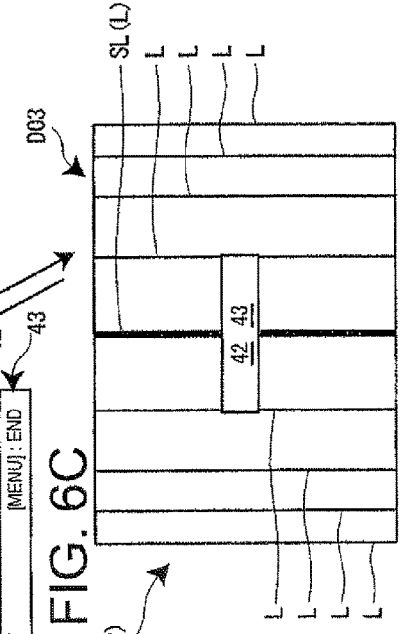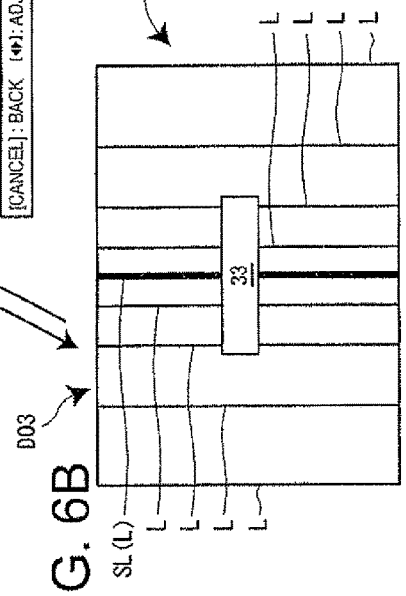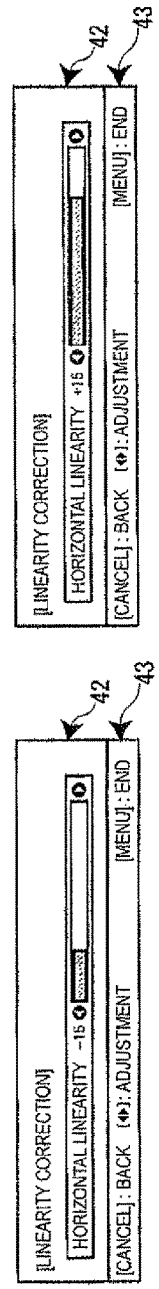

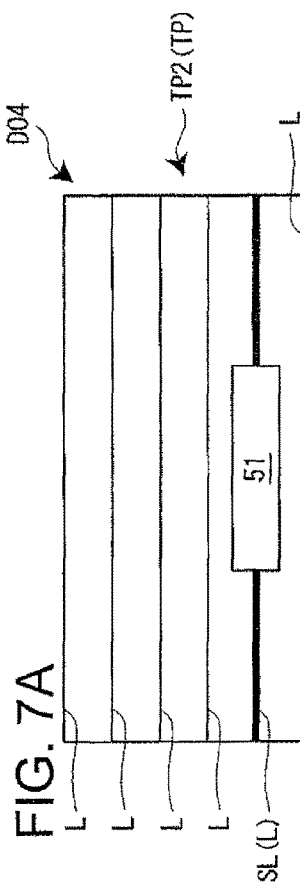
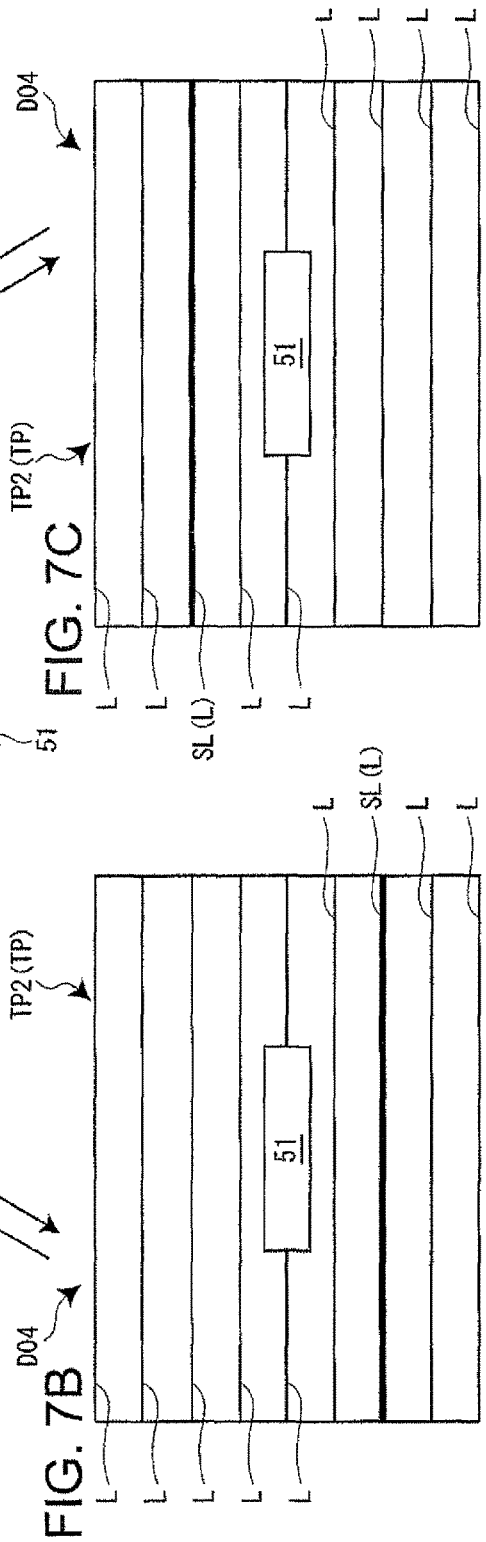

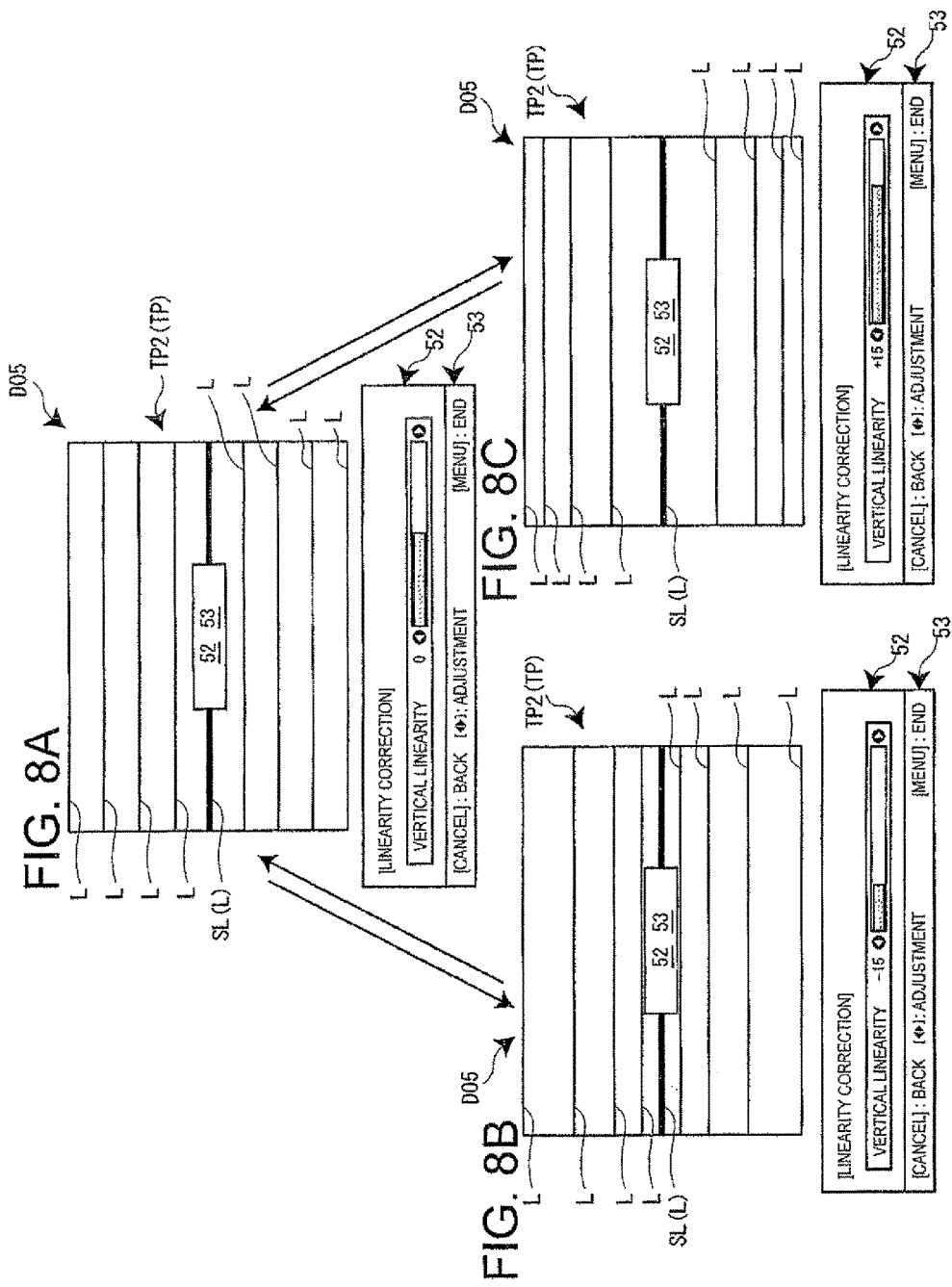

FIG. 9A
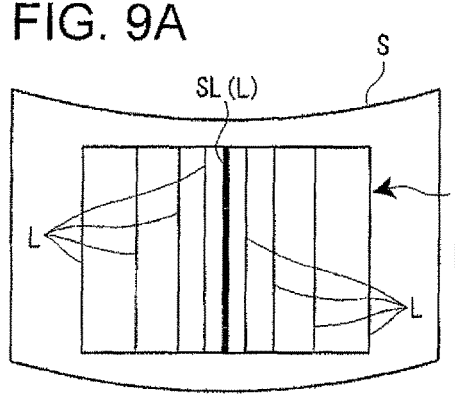
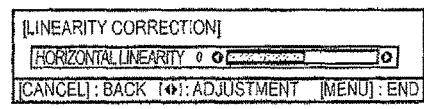
FIG. 9B
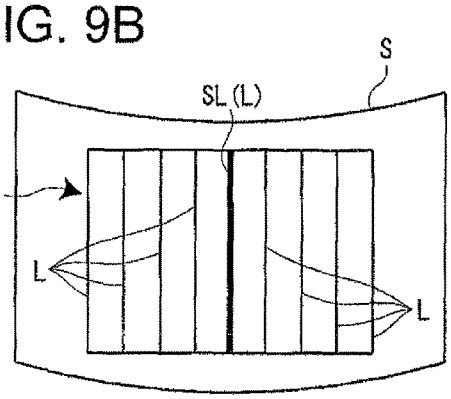
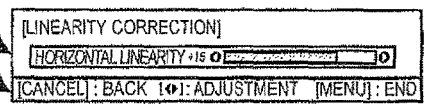
FIG. 9C
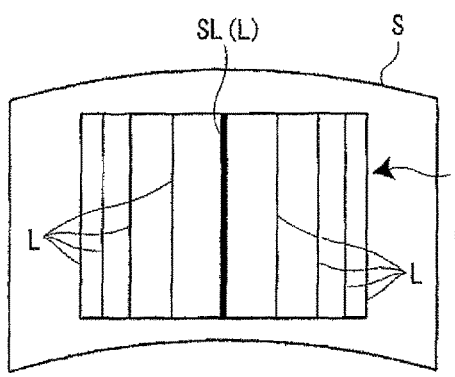
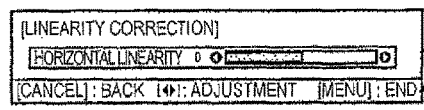
FIG. 9D
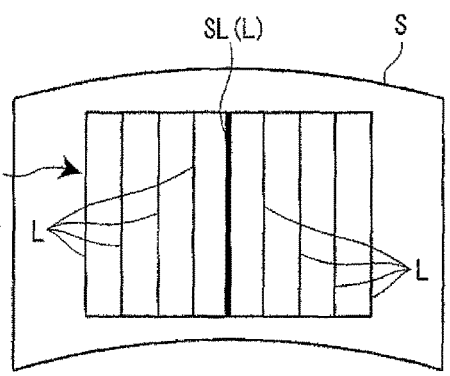
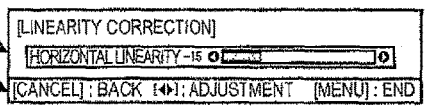

IMAGE DISPLAY APPARATUS AND IMAGE ADJUSTMENT METHOD OF IMAGE DISPLAY APPARATUS

CROSS-REFERENCE TO RELATED APPLICATION

This application is a continuation of U.S. patent application Ser. No. 14/013,477, filed on Aug. 29, 2013, which claims priority to Japanese Patent Application No. 2012-220251, filed Oct. 2, 2012. The entire disclosure of both applications is expressly incorporated by reference herein.

BACKGROUND

1. Technical Field

The present invention relates to an image display apparatus for displaying an image on an image display surface, and an image adjustment method of the image display apparatus.

2. Related Art

In the past, there has been known a scanning image display apparatus capable of correcting the linearity (non-linearity distortion) of an image projected on a screen. In, for example, JP-A-2007-199251, as a method of correcting the vertical linearity, there is disclosed a method of obtaining a pitch θp of a field angle in the vertical direction, with which a pitch ratio Ryp of the scan image is always constant with respect to a pitch count n obtained by counting the pitch upward from the polarized light beam reaching the center of the scan image, and driving a vertical polariscope in a nonlinear manner to thereby correct the vertical linearity.

However, in the case of correcting the linearity using the scanning image display apparatus described above, there is a problem that it is difficult for the user to visually figure out how the linearity of the image is actually corrected.

SUMMARY

An advantage of some aspects of the invention is to provide an image display apparatus and an image adjusting method of an image display apparatus each capable of providing a linearity correction function easy to visually understand for the user.

An aspect of the invention is directed to an image display apparatus that displays an image modulated by a light modulator on an image display surface, and the apparatus includes a test pattern display section adapted to display a test pattern, which includes a plurality of indexes arranged in one of directions including a horizontal direction and a vertical direction with respect to a display region of the light modulator at regular intervals, in the display region, an index operation section adapted to set at least one of the plurality of indexes as a reference index, and adjust the intervals of the indexes of the test pattern so as to increase or decrease as a distance from the reference index increases with respect to the direction of the arrangement of the indexes taking the reference index as a reference, and a linearity correction section adapted to correct linearity of the image based on the intervals of the indexes adjusted by the index operation section.

Another aspect of the invention is directed to an image adjustment method of an image display apparatus that displays an image modulated by a light modulator on an image display surface, and the method includes: displaying a test pattern, which includes a plurality of indexes arranged in one of directions including a horizontal direction and a vertical direction with respect to a display region of the light modulator at regular intervals, in the display region, and setting at least one of the plurality of indexes as a reference index, adjusting the intervals of the indexes of the test pattern so as to increase or decrease as a distance from the reference index increases with respect to the direction of the arrangement of the indexes taking the reference index as a reference, and correcting linearity of the image based on the intervals of the indexes adjusted.

According to these configurations, the linearity of the image in the case of displaying the image on the image display surface having a curved surface shape is corrected by adjusting the positions of the indexes of the test pattern displayed. In other words, it is possible for the user to perform the position adjustment of the indexes so as to have the regular intervals centered on the reference index by moving the plurality of indexes closer to the reference index or apart from the reference index while watching the test pattern displayed on the image display surface to thereby correct the linearity. Thus, the user can perform the correction while visually figuring out how the linearity of the image is actually corrected. It should be noted that the indexes are preferably indicated by a straight line, a dot, and so on.

In the image display apparatus according to the aspect of the invention, it is preferable that the image display apparatus further includes a mode selection operation section adapted to select either one of a horizontal mode of correcting horizontal linearity of the image and a vertical mode of correcting vertical linearity of the image, and the test pattern display section displays the test pattern including the plurality of indexes arranged horizontally at regular intervals in the display region of the light modulator in a case in which the horizontal mode is selected, and the test pattern including the plurality of indexes arranged vertically at regular intervals in the display region of the light modulator in a case in which the vertical mode is selected.

According to the configuration described above, whether the linearity correction in a horizontal direction (the horizontal linearity correction) is to be performed or the linearity correction in the vertical direction (the vertical linearity correction) is to be performed can be selected in accordance with the shape of the projection surface.

In the image display apparatus according to the aspect of the invention, it is preferable that the indexes are each indicated by a linear shape.

According to the configuration described above, by indicating the indexes by a linear shape (a straight line), the user can easily figure out the movement of the indexes and the intervals between the indexes.

In the image display apparatus according to the aspect of the invention, it is preferable that the image display apparatus further includes a reference selection section adapted to receive an operation of selecting the reference index out of the plurality of indexes.

According to the configuration described above, the user can select the reference index for correcting the linearity. For example, in the case of the image display apparatus for projecting the image on the projection surface such as a projector, by selecting the reference index in accordance with the installation position of the projector with respect to the projection surface, for example, the linearity can more appropriately be corrected.

In the image display apparatus according to the aspect of the invention, it is preferable that the image display apparatus further includes a region setting section adapted to set the display region of the test pattern in the light modulator, and the test pattern display section displays the test pattern in the display region set by the region setting section.

According to the configuration described above, the linearity can be corrected by displaying the test pattern only in a part (e.g., a left half or right half of the display region) of the display region of the image display apparatus. Thus, even in the case in which, for example, the image display surface waves, the linearity of the image can appropriately be corrected by performing the correction part by part.

BRIEF DESCRIPTION OF THE DRAWINGS

The invention will be described with reference to the accompanying drawings, wherein like numbers reference like elements.

FIGS. 2A through 2D are diagrams for explaining a linearity correction, wherein FIG. 2A is a diagram for explaining the case of projecting an image on a projection surface, which is horizontally convex with respect to the projector, FIG. 2B is a diagram for explaining the case of projecting an image on a projection surface, which is horizontally concave, FIG. 2C is a diagram for explaining the case of projecting an image on a projection surface, which is vertically convex, and FIG. 2D is a diagram for explaining the case of projecting an image on a projection surface, which is vertically concave.

FIGS. 5A through 5C are diagrams for explaining a reference position selection screen for the horizontal linearity, wherein FIG. 5A shows the state of selecting a central index line as a reference index line, FIG. 5B shows the state of selecting a left index line as the reference index line, and FIG. 5C is a diagram showing the case of selecting a right index line as the reference index line.

FIGS. 6A through 6C are diagrams for explaining an expansion/contraction adjustment screen for the horizontal linearity, wherein FIG. 6A shows a test pattern having the index lines arranged horizontally at regular intervals, FIG. 6B shows a test pattern in the case in which an expansion/contraction gauge is operated leftward, and FIG. 6C is a diagram showing a test pattern in the case in which the expansion/contraction gauge is operated rightward.

FIGS. 7A through 7C are diagrams for explaining a reference position selection screen for the vertical linearity, wherein FIG. 7A shows the state of selecting a central index line as a reference index line, FIG. 7B shows the state of selecting a lower index line as the reference index line, and FIG. 7C is a diagram showing the case of selecting au upper index line as the reference index line.

FIGS. 8A through 8C are diagrams for explaining an expansion/contraction adjustment screen for the vertical linearity, wherein FIG. 8A shows a test pattern having the index lines arranged vertically at regular intervals, FIG. 8B shows a test pattern in the case in which an expansion/contraction gauge is operated leftward, and FIG. 8C is a diagram showing a test pattern in the case in which the expansion/contraction gauge is operated rightward.

FIGS. 9A through 9D are diagrams for explaining a procedure in the case of correcting the horizontal linearity.

DESCRIPTION OF AN EXEMPLARY EMBODIMENT

Figure 1:
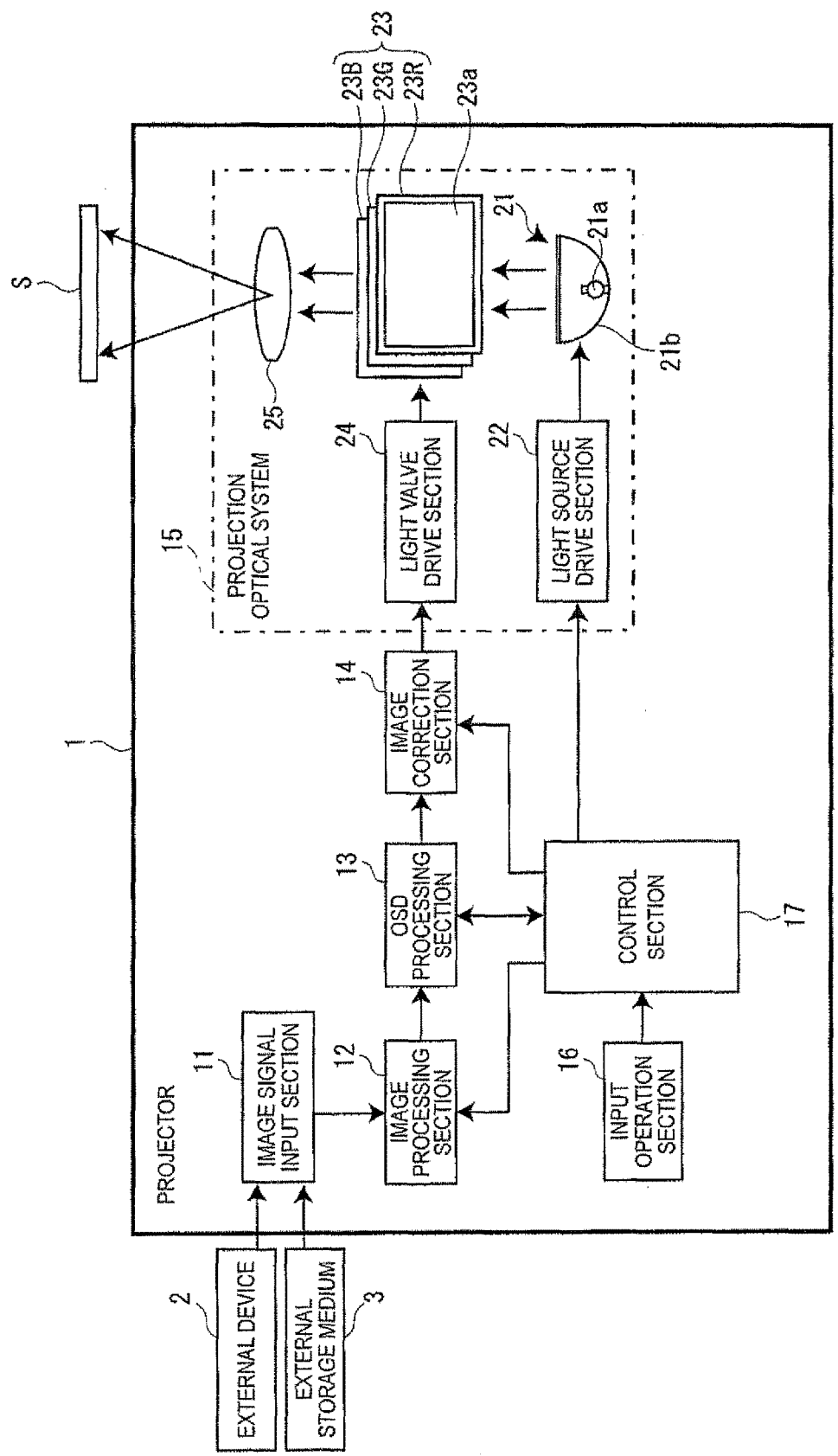
FIG. 1 is a block diagram showing a configuration of the projector according to an embodiment of the invention.

An image display apparatus and an image adjustment method of an image display apparatus according to an embodiment of the invention will hereinafter be explained with reference to the accompanying drawings. As an example of the image display apparatus according to the present embodiment, a projector 1 will be explained. FIG. 1 is a block diagram showing a configuration of the projector 1. As shown in the drawing, the projector 1 is provided with an image signal input section 11, an image processing section 12, an OSD processing section 13, an image correction section 14 (a linearity correction section), a projection optical system 15, an input operation section 16, and a control section 17 for controlling these sections.

The image signal input section 11 gets image information (an image signal) from an external device 2 such as a personal computer or a DVD player, or an external storage medium 3 such as a USB memory or a compact flash (a registered trade mark) memory card.

The image processing section 12 performs a predetermined image processing on the image information, which is gotten by the image signal input section 11, based on an image processing program previously stored. As the predetermined image processing, image quality regulation such as resolution conversion or a sharpness adjustment, and so on are included.

The OSD processing section 13 performs a process of superimposing an on-screen display (OSD) screen, which is composed of a menu image, a message image (an OSD image), and so on, on the image information input from the image processing section 12 based on an instruction of the control section 17. The OSD processing section 13 is provided with an OSD memory not shown, and stores the OSD image information representing figures, fonts, and so on for forming the OSD image. When the control section 17 instructs the superimposition of the OSD image, the OSD processing section 13 reads out the necessary OSD image information from the OSD memory, and then performs the process of superimposing the OSD image information at a predetermined position of the image information input. The image information combined with the OSD image information is then output to the image correction section 14. On the other hand, in absence of the instruction from the control section 17 to superimpose the OSD image, the OSD processing section 13 outputs the image information, which is input from the image processing section 12, directly to the image correction section 14. It should be noted that a "test pattern display section" in the appended claims has the OSD processing section 13 as a principal component.

The image correction section 14 expands or contracts the image information gotten from the OSD processing section 13 based on the instruction from the control section 17 to thereby mainly correct the linearity. Then, the image correction section 14 outputs the image information thus corrected to the light valve drive section 24. It should be noted that in absence of the instruction (the instruction of the expansion/contraction correction) for correcting the linearity of the image from the control section 17, the image correction section 14 outputs the image information, which is input from the OSD processing section 13, to the light valve drive section 24 without modification.

The projection optical system 15 is for projecting the image on a projection surface S (an image display surface) such as a screen, and includes a light source section 21, a light source drive section 22, liquid crystal light valves 23 (a light modulator), the light valve drive section 24, and a projection lens 25.

The light source section 21 is composed of a light source lamp 21a formed of, for example, a halogen lamp, a metal halide lamp, or a high-pressure mercury lamp, and a reflector 21*b* for reflecting the light, which is emitted from the light source lamp 21*a*, in roughly the same direction. The light (illumination light) emitted from the light source section 21 is separated into colored light components of red (R), green (G), and blue (B) by a light separation optical system not shown, and the colored light components subsequently enter the liquid crystal light valves 23 (23R, 23G, and 23B), respectively. The light source drive section 22 controls supply and stop of the power to the light source section 21 based on the instruction from the control section 17, to thereby switch between lighting and extinction of the light source section 21.

The liquid crystal light valves 23 are each formed of a liquid crystal panel having a liquid crystal material encapsulated between a pair of transparent substrates. The liquid crystal light valves 23 each have a pixel area 23*a* (a display area in the appended claims) having a rectangular shape and composed of a plurality of pixels arranged in a matrix, and are each arranged to be able to apply a drive voltage to the liquid crystal pixel by pixel. The light valve drive section 24 applies a drive voltage corresponding to the image information to each of the pixels of the liquid crystal light valves 23 to thereby set the light transmittance of each of the pixels.

According to the configuration described above, in the projection optical system 15, the light emitted from the light source section 21 is modulated while being transmitted through the pixel area 23*a* of each of the liquid crystal light valves 23, and thus the image corresponding to the image information is formed for each of the colored lights. The images of the respective colors thus formed are combined pixel by pixel by a light combining optical system (e.g., a dichroic prism) not shown, and are then projected on the projection surface S by the projection lens 25.

The input operation section 16 is for receiving an input operation of the user, and is provided with a plurality of operation keys for the user to provide various instructions to the projector 1. As the operation keys, there can be cited, for example, a power key for switching ON/OFF of the power, a menu key for displaying or terminating the OSD menu screen for various settings, a determination key for determining the item selected in the OSD menu screen and so on, four direction keys corresponding respectively to upward, downward, leftward, and rightward directions, and a cancel key for canceling the operation or getting back to a previous operation (screen). It should be noted that an "index operation section," a "mode selection operation section," and a "reference selection section" in the appended claims have the input operation section 16 as a principal component.

When the user operates a variety of operation keys of the input operation section 16, the input operation section 16 outputs an operation signal corresponding to the operation content by the user to the control section 17. In the present embodiment, the input operation section 16 is mainly used as an operation device for correcting the linearity (the nonlinearity distortion) of the image by the linearity correction function of the image provided as one of the functions in the OSD menu (the details will be described later).

It should be noted that it is also possible to adopt a configuration of using a remote controller (not shown) capable of a remote operation as the input operation section 16. In this case, the remote controller transmits an operation signal on an infrared ray corresponding to the operation content by the user, and then a remote control signal receiving section not shown receives the operation signal and transfers the operation signal to the control section 17.

The control section 17 is composed of a central processing unit (CPU), a read only memory (ROM), a random access memory (RAM), and so on. The CPU is a central processing device for performing a variety of arithmetic processing, and performs input and output of signals with each of the sections to thereby integrally control the projector 1. The ROM stores a control program and control data used by the CPU for performing the variety of arithmetic processing. The control program includes an image processing program used in the image processing section 12 described above. The RAM is used as the working area when the CPU performs the variety of arithmetic processing.

Then, an outline of the linearity correction of the projector 1 will be explained with reference to FIGS. 2A through 2D. The linearity correction is for correcting expansion and contraction of the image caused when projecting an image to the projection surface S (e.g., a cylindrical surface) having a curved surface shape. FIGS. 2A through 2D are diagrams showing a projection image G in the case of installing the projector 1 straight in front of the projection surface S having a curved surface shape. It should be noted that it is assumed that a keystone distortion, a pin-cushion distortion (a barrel distortion), and so on caused when projecting the image on the projection surface S having a curved surface shape are corrected using known technologies.

Figure 2A:
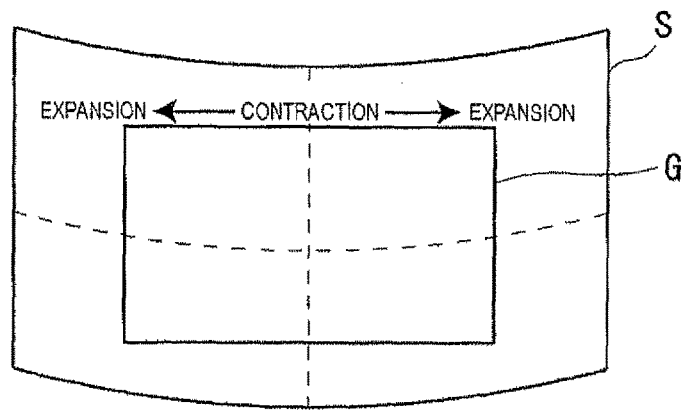

FIG. 2A shows the case of projecting the image on the projection surface S having a curved surface (a convex surface), which has no distortion in a longitudinal direction, namely in a vertical direction, and has the center portion convex toward the projector 1 in a lateral direction, namely a horizontal direction. In this case, compared to the case of projecting the image on the projection surface having a flat shape, the projection image G is displayed so as to be contracted (displayed as a shrunk image) in the central portion, and enlarged (displayed as an expanded image) as the distance increases toward the right or left end. Therefore, by setting an image expanded or contracted in the opposite direction to the case of the projection image G (i.e., the image expanded in the central portion and contracted as the distance increases toward the right or left end) in the pixel area 23*a*, it is possible to cancel out the expansion/contraction distortion of the image to thereby display an image without expansion and contraction on the projection surface S.

Figure 2B:
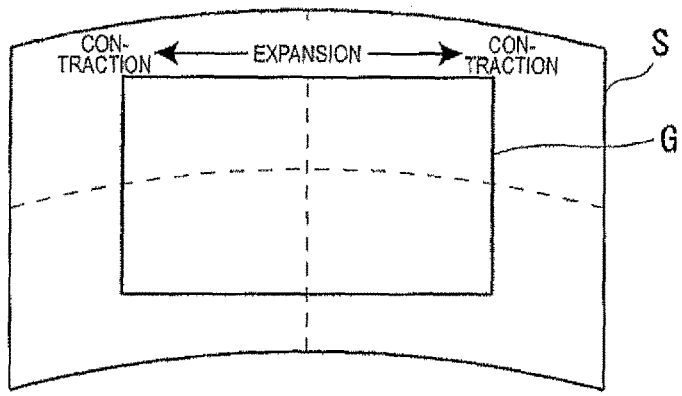

Further, FIG. 2B shows the case of projecting the image on the projection surface S having a curved surface (a concave surface), which has no distortion in the vertical direction, and has the center portion convex toward the side distant from the projector 1 in the horizontal direction. In this case, compared to the case of projecting the image on the projection surface having a flat shape, the projection image G is displayed so as to be expanded in the central portion, and contracted as the distance increases toward the right or left end. Therefore, by setting an image expanded or contracted in the opposite direction to the case of the projection image G (i.e., the image contracted in the central portion and expanded as the distance increases toward the right or left end) in the pixel area 23*a*, it is possible to cancel out the expansion/contraction distortion of the image to thereby display an image without expansion and contraction on the projection surface S.

Figure 2C:
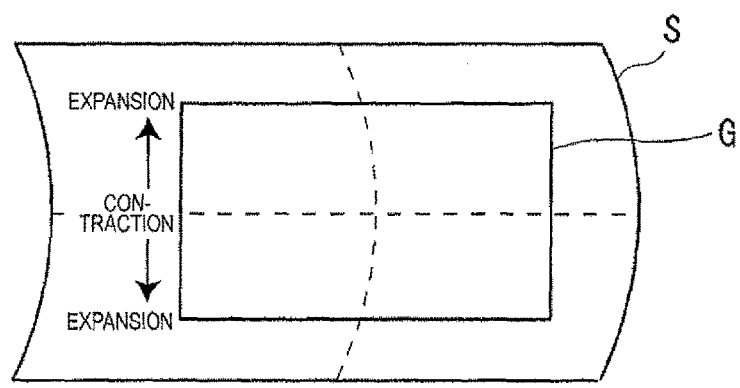

Further, FIG. 2C shows the case of projecting the image on the projection surface S having a curved surface (a convex surface), which has no distortion in the horizontal direction, and has the center portion convex toward the projector 1 in the vertical direction. In this case, compared to the case of projecting the image on the projection surface having a flat shape, the projection image G is displayed so as to be contracted in the central portion, and expanded as the distance increases toward the upper or lower end. Therefore, by setting an image expanded or contracted in the opposite direction to the case of the projection image G (i.e., the image expanded in the central portion and contracted as the distance increases toward the upper or lower end) in the pixel area 23a, it is possible to cancel out the expansion/contraction distortion of the image to thereby display an image without expansion and contraction on the projection surface S.

Figure 2D:
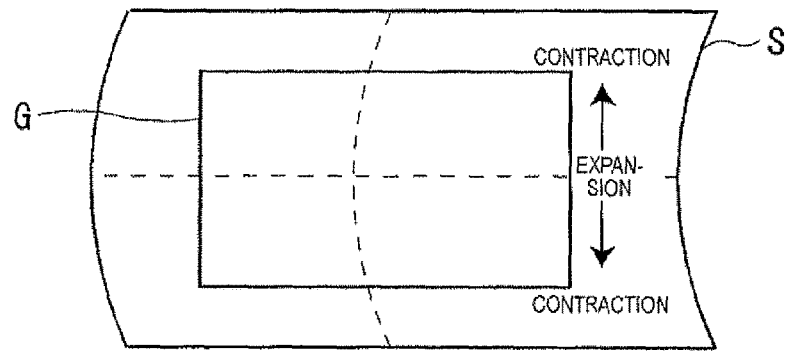

Further, FIG. 2D shows the case of projecting the image on the projection surface S having a curved surface (a concave surface), which has no distortion in the horizontal direction, and has the center portion convex toward the side distant from the projector 1 in the vertical direction. In this case, compared to the case of projecting the image on the projection surface having a flat shape, the projection image G is displayed so as to be expanded in the central portion, and contracted as the distance increases toward the upper or lower end. Therefore, by setting an image expanded or contracted in the opposite direction to the case of the projection image G (i.e., the image contracted in the central portion and expanded as the distance increases toward the upper or lower end) in the pixel area 23a, it is possible to cancel out the expansion/contraction distortion of the image to thereby display an image without expansion and contraction on the projection surface S.

In the present embodiment, the nonlinearity distortion (linearity distortion) of the image projected on the projection surface S having such a curved surface shape described above is corrected using the linearity correction function provided by the OSD menu.

Figure 3:
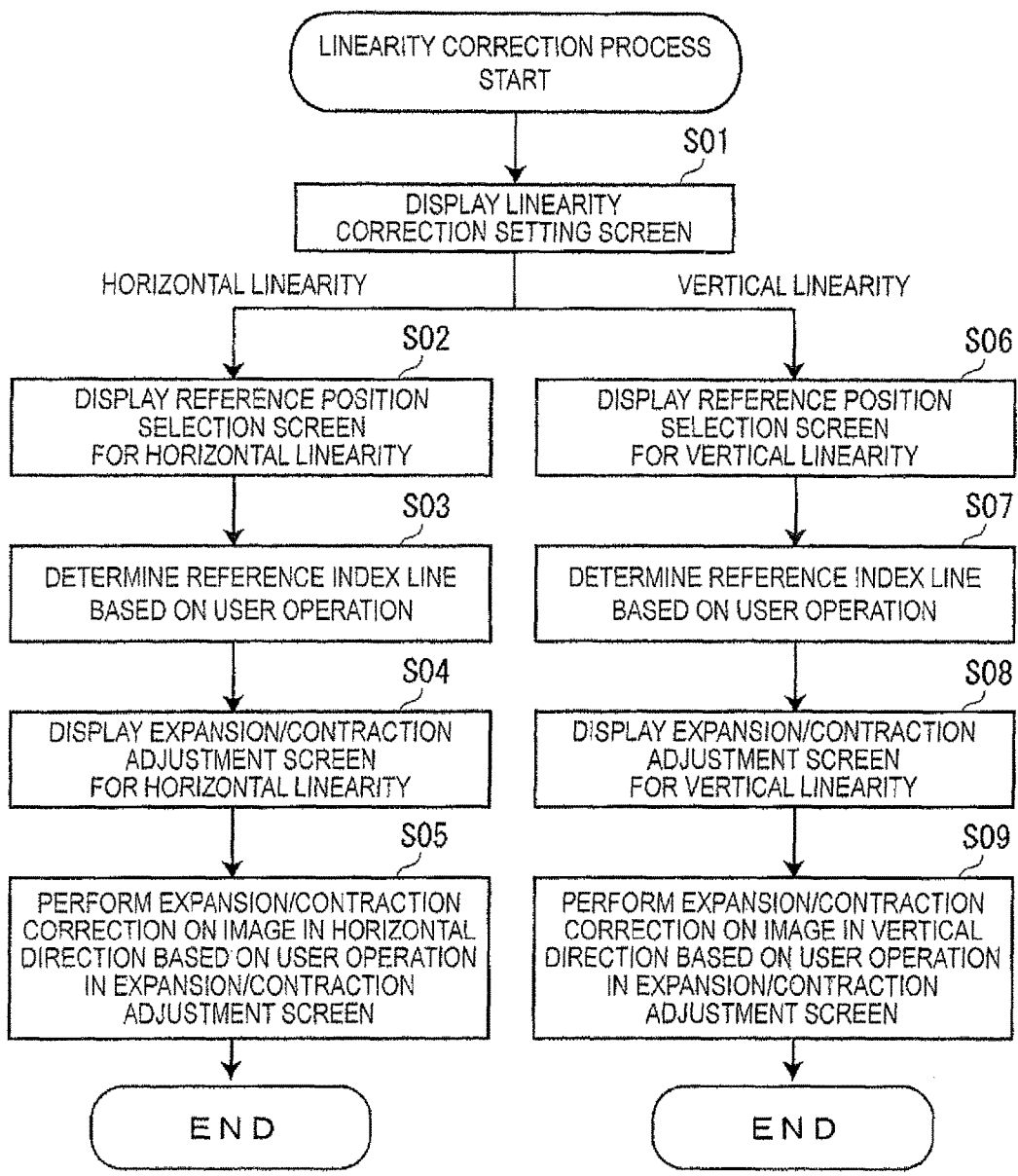
FIG. 3 is a flowchart showing a procedure of the linearity correction.

Then, the operation of the projector 1 when performing the linearity correction will be explained with reference to FIGS. 3, 4, 5A through 5C, 6A through 6C, 7A through 7C, and 8A through 8C. FIG. 3 is a flowchart showing a procedure of the linearity correction. FIGS. 4, 5A through 5C, 6A through 6C, 7A through 7C, and 8A through 8C are diagrams for explaining an example of the operation screen operated by the user when performing the linearity correction, and the operation method. It should be noted that FIGS. 4, 5A through 5C, 6A through 6C, 7A through 7C, and 8A through 8C show the operation screens displayed in the pixel area 23a of each of the liquid crystal light valves 23.

Figure 4:
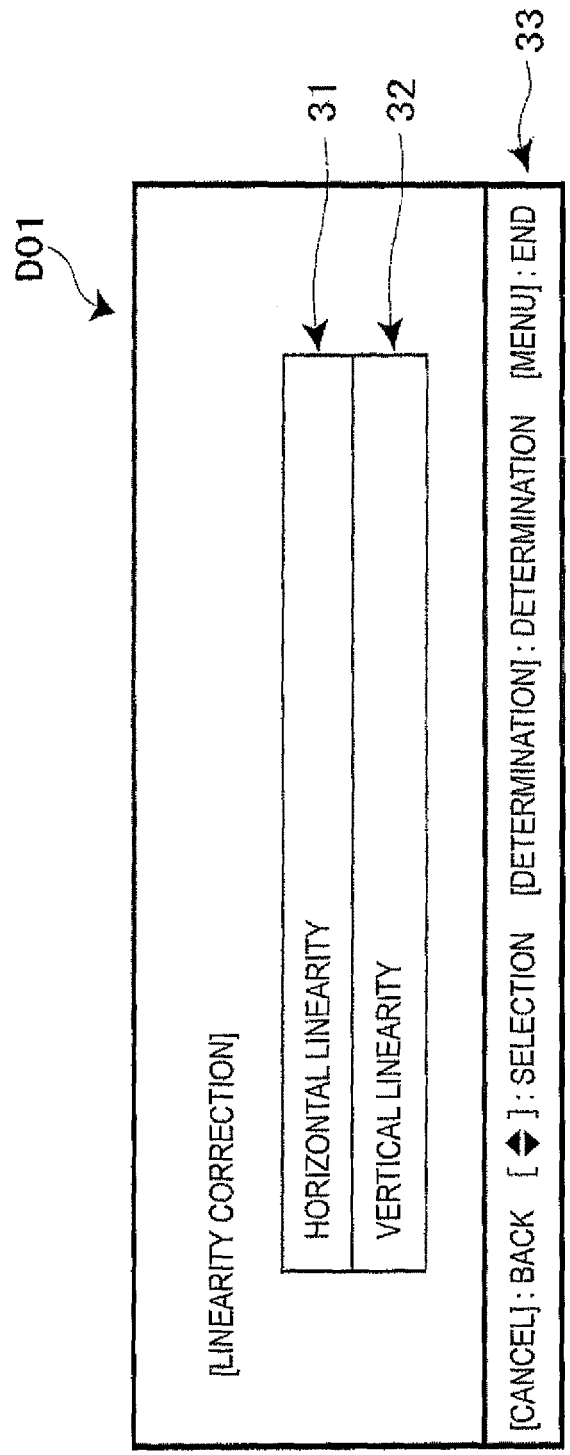
FIG. 4 is a diagram for explaining a linearity correction setting screen.

Firstly, when the item of the "linearity correction" is selected by the user in the OSD menu screen, the control section 17 of the projector 1 instructs the OSD processing section 13 to display (S01 in FIG. 3) a linearity correction setting screen D01 (see FIG. 4).

As shown in FIG. 4, in the linearity correction setting screen D01, there are displayed two alternatives, namely a "horizontal linearity 31 (a horizontal mode)" for correcting the horizontal linearity of the image, and a "vertical linearity 32 (a vertical mode)" for correcting the vertical linearity, and operation guide information 33 for guiding the operable keys out of the operation keys provided to the input operation section 16 and the functions of the operable keys.

The user selects the item corresponding to the shape of the projection surface S in the linearity correction setting screen D01. In other words, in the case in which the projection surface S is one of the curved surfaces (curved surfaces drawing an arc in the horizontal direction) as shown in FIGS. 2A and 2B, the "horizontal linearity 31" is selected, and in the case in which the projection surface S is one of the curved surfaces (curved surfaces drawing an arc in the vertical direction) as shown in FIGS. 2C and 2D, the "vertical linearity 32" is selected.

Then, in the linearity correction setting screen D01, in the case in which the "horizontal linearity 31" is selected by the user operation, the control section 17 instructs the OSD processing section 13 to display (S02 in FIG. 3) a reference position selection screen D02 (see FIGS. 5A through 5C) for the horizontal linearity (for the horizontal linearity correction).

As shown in FIGS. 5A through 5C, in the reference position selection screen D02 for the horizontal linearity, there are displayed a test pattern TP1 (TP) including a plurality of index lines L (9 index lines L are shown as an example in the present embodiment) used as a guide of the expansion and the contraction of the image arranged horizontally at regular intervals, and operation guide information 41. It should be noted that the test pattern TP is displayed in the entire pixel area 23a. Further, it is also possible to display the test pattern TP so as to be superimposed on the image input from the image signal input section 11, or to display the test pattern TP alone.

The reference position selection screen D02 is a screen for selecting the index line L (hereinafter referred to as a "reference index line SL," and indicated by a heavy line in the drawings for the sake of convenience) to be the reference position of the expansion and the contraction of the image, and is displayed in the state in which the index line L located at the center is selected as the reference index line SL as an initial setting (FIG. 5A). The selected (not yet determined) reference index line SL is blinked (e.g., red→white→red), and the rest of the index lines L are displayed with a gray color (indicated by thin lines in the drawings for the sake of convenience). The user selects the index line L at the desired position in accordance with, for example, the projection position of the projector 1 with respect to the projection surface S, and then sets the index line L as the reference index line SL. Specifically, the user selects the reference index line SL as shown in FIGS. 5B and 5C by operating the direction keys (the right and left keys), and then determines the reference index line SL by operating the determination key. It should be noted that although in the drawings the operation guide information 41 is shown below the test pattern TP1 for the sake of convenience, in reality, the operation guide information 41 is displayed at a predetermined position (e.g., the position of the reference number 41 at the center) of the test pattern TP1 in a superimposed manner (the same applies to the following explanation).

Then, in the case in which the reference index line SL is determined (S03 in FIG. 3) in the reference position selection screen D02, the control section 17 instructs the OSD processing section 13 to display (S04 in FIG. 3) the expansion/contraction adjustment screen D03 (see FIGS. 6A through 6C) for the horizontal linearity.

As shown in FIG. 6A, in the expansion/contraction adjustment screen D03, there are displayed a test pattern TP1 in which the index lines L are arranged horizontally at regular intervals, and the selected reference index line SL is shown with a red color (the heavy line in the drawings), and the rest of the index lines L are shown with a white color (the thin lines in the drawings), an expansion/contraction gauge 42 for performing the horizontal expansion/contraction adjustment of the image, and the operation guide information 43. When the expansion/contraction gauge 42 is operated by the user operation, the control section 17 instructs the image correction section 14 to perform (S05 in FIG. 3) the expansion/contraction correction corresponding to the adjustment amount of the expansion/contraction gauge 42. It should be noted that the expansion/contraction correction is performed so that the expansion/contraction of the OSD image and the expansion/contraction of the image coordinate with each other.

Specifically, when the expansion/contraction gauge 42 is operated leftward (toward the negative side) due to the operation of the direction keys by the user in the state shown in FIG. 6A, the control section 17 translates the positions of the index lines L other than the reference index line SL in the directions toward the reference index line St taking the reference index line SL as the reference so that the interval between the index lines L adjacent to each other increases as the distance from the reference index line SL increases (translates the index lines L other than the reference index line SL so as to converge on the reference index line SL), and at the same time, expands or contracts the images displayed between the index lines L in accordance with the intervals of the index lines L in conjunction with the translation. In other words, by expanding or contracting the image so as to be contracted in the vicinity of the reference index line SL, and expanded as the distance from the reference index line SL increases, the horizontal linearity is corrected (FIG. 6B).

In contrast, when the user operates the expansion/contraction gauge 42 rightward (toward the positive side) in the state shown in FIG. 6A, the control section 17 translates the positions of the index lines L other than the reference index line SL in the directions away from the reference index line SL taking the reference index line SL as the reference so that the interval between the index lines L adjacent to each other decreases as the distance from the reference index line SL increases (translates the index lines L other than the reference index line SL so as to diffuse centered on the reference index line SL), and at the same time, expands or contracts the images displayed between the index lines L in accordance with the intervals of the index lines L. In other words, by expanding or contracting the image so as to be expanded in the vicinity of the reference index line SL, and contracted as the distance from the reference index line SL increases, the horizontal linearity is corrected (FIG. 6C).

Further, in the linearity correction setting screen D01 (see FIG. 4), in the case in which the "vertical linearity 32" is selected by the user operation, the control section 17 instructs the OSD processing section 13 to display (S06 in FIG. 3) a reference position selection screen D04 (see FIGS. 7A through 7C) for the vertical linearity (for the vertical linearity correction). It should be noted that the explanation of substantially the same parts as in the case of selecting the horizontal linearity 31 described above will be eliminated.

As shown in FIGS. 7A through 70, in the reference position selection screen D04 for the vertical linearity, there are displayed a test pattern TP2 (TP) including a plurality of index lines L used as a guide of the expansion and the contraction of the image arranged vertically at regular intervals, and operation guide information 51. In the reference position selection screen D04, the user selects the reference index line SL as shown in FIGS. 7B and 7C by operating the direction keys (the up and down keys), and then determines the reference index line SL by operating the determination key.

Then, in the case in which the reference index line SL is determined (S07 in FIG. 3) in the reference position selection screen D04, the control section 17 instructs the OSD processing section 13 to display (S08 in FIG. 3) the expansion/contraction adjustment screen D05 (see FIGS. 8A through 8C) for the vertical linearity.

As shown in FIG. 8A, in the expansion/contraction adjustment screen D05, there are displayed a test pattern TP2 in which the index lines L are arranged vertically at regular intervals, and the selected reference index line SL is shown with a red color (the heavy line in the drawings), and the rest of the index lines L are shown with a white color (the thin lines in the drawings), an expansion/contraction gauge 52 for performing the vertical expansion/contraction adjustment of the image, and the operation guide information 53. When the expansion/contraction gauge 52 is operated by the user operation, the control section 17 instructs the image correction section 14 to perform (S09 in FIG. 3) the expansion/contraction correction corresponding to the adjustment amount of the expansion/contraction gauge 52.

Specifically, when the expansion/contraction gauge 52 is operated leftward (toward the negative side) due to the operation of the direction keys by the user in the state shown in FIG. 8A, the control section 17 translates the positions of the index lines L other than the reference index line SL in the directions toward the reference index line SL taking the reference index line SL as the reference so that the interval between the index lines L adjacent to each other increases as the distance from the reference index line SL increases (translates the index lines L other than the reference index line SL so as to converge on the reference index line SL), and at the same time, expands or contracts the images displayed between the index lines L in accordance with the intervals of the index lines L in conjunction with the translation. In other words, by expanding or contracting the image so as to be contracted in the vicinity of the reference index line SL, and expanded as the distance from the reference index line SL increases, the vertical linearity is corrected (FIG. 8B).

In contrast, when the user operates the expansion/contraction gauge 52 rightward (toward the positive side) in the state shown in FIG. 8A, the control section 17 translates the positions of the index lines L other than the reference index line SL in the directions away from the reference index line SL taking the reference index line SL as the reference so that the interval between the index lines L adjacent to each other decreases as the distance from the reference index line SL increases (translates the index lines L other than the reference index line SL so as to diffuse centered on the reference index line SL), and at the same time, expands or contracts the images displayed between the index lines L in accordance with the intervals of the index lines L. In other words, by expanding or contracting the image so as to be expanded in the vicinity of the reference index line SL, and contracted as the distance from the reference index line SL increases, the vertical linearity is corrected (FIG. 8C).

Then, the specific procedure in correcting the linearity will be explained with reference to FIGS. 9A through 9D. Here, the horizontal linearity correction will be explained.

FIG. 9A is a diagram for explaining the linearity correction in the case of performing the projection on the projection surface S (the convex surface) convex toward the projector 1. In this case, when the projector 1 (the control section 17) projects the test pattern TP1 (see FIG. 6A) having the index lines L arranged horizontally at regular intervals, the test pattern TP1 contracted in the vicinity of the reference index line SL and expanded as the distance increases toward the right or left end, namely the test pattern TP1 having the dense intervals between the index lines L in the vicinity of the reference index line SL and the interval between the index lines L increasing as the distance from the reference index line SL increases, is displayed on the projection surface S as shown in FIG. 9A.

The user operates the expansion/contraction gauge 42 so that the intervals between the index lines L are equal to each other while watching the index lines L of the test pattern TP1 projected on the projection surface S. On this occasion, as shown in FIG. 9B, the user adjusts the expansion/contraction gauge 42 rightward (toward the positive side) to thereby adjust the intervals between the index lines L to be equal to each other by translating the index lines L of the test pattern TP1 on the projection surface S in the directions away from the reference index line SL. In other words, by performing the correction so that the test pattern TP1 (e.g., the test pattern TP1 shown in FIG. 6C) expanded or contracted in the opposite directions to the directions of the test pattern TP1 on the projection surface S shown in FIG. 9A is set to the pixel area 23a, the image without the expansion and the contraction can be displayed on the projection surface S.

Further, as shown in FIG. 9C, in the case of performing the projection on the projection surface S (the concave surface) convex in the direction away from the projector 1, when the projector 1 (the control section 17) projects the test pattern TP1 (see FIG. 6A) having the index lines L arranged horizontally at regular intervals, the test pattern TP1 expanded in the vicinity of the reference index line SL and contracted as the distance increases toward the right or left end, namely the test pattern TP1 having the intervals between the index lines L enlarged in the vicinity of the reference index line SL and the index lines L thickened as the distance from the reference index line SL increases, is displayed on the projection surface S as shown in FIG. 9C.

On this occasion, as shown in FIG. 9D, the user adjusts the expansion/contraction gauge 42 leftward (toward the negative side) to thereby adjust the intervals between the index lines L to be equal to each other by translating the index lines L of the test pattern TP1 on the projection surface S in the directions toward the reference index line SL. In other words, by performing the correction so that the test pattern TP1 (e.g., the test pattern TP1 shown in FIG. 6B) expanded or contracted in the opposite directions to the directions of the test pattern TP1 on the projection surface S shown in FIG. 9C is set to the pixel area 23a, the image without the expansion and the contraction can be displayed on the projection surface S.

As explained hereinabove, according to the present embodiment, by displaying the test pattern TP on the projection surface S and then adjusting the positions of the indexes of the test pattern TP displayed, the linearity of the image caused in the case of displaying the image on the projection surface S formed of a curved surface is corrected. In other words, it is possible for the user to perform the position adjustment of the index lines L so as to have the regular intervals centered on the reference index line SL by moving the plurality of index lines L closer to the reference index line SL or apart from the reference index line SL while watching the test pattern TP displayed on the projection surface S to thereby correct the linearity. Thus, the user can perform the correction while visually figuring out how the linearity of the image is actually corrected.

It should be noted that although it is assumed in the present embodiment that the number of index lines L of the test pattern TP is 9, the number is illustrative only, and is not limited to 9. Further, it is also possible to arrange that the number of index lines L can be set as one of the setting items of the linearity correction.

Further, although in the present embodiment the indexes of the test pattern TP are indicated by the straight lines (solid lines), the shape of the index is not limited to the straight line, but can take any form providing the movement of the index, the interval between the indexes, and so on can be recognized. For example, it is also possible to indicate the index by a dotted line, or by a dot instead of the straight line (a linear shape). Alternatively, it is also possible to display a figure such as a circle or a rectangle as the index.

Further, although in the present embodiment, the test pattern TP is displayed in the entire pixel area 23a, it is also possible to arrange that the test pattern TP is displayed in a part of the pixel area 23a. In this case, a region setting item (a region setting section) is provided as one of the setting items of the linearity correction, and the display region of the test pattern TP in the pixel area 23a is set. For example, in the case of performing the horizontal linearity correction, the user is allowed to select either of the regions obtained by horizontally dividing the pixel area 23a into a plurality of regions (e.g., a right half or a left half out of the halves obtained by horizontally dividing the pixel area 23a), and the test pattern TP is displayed only in the selected region to correct the linearity. In the case of performing the vertical linearity correction, the user is allowed to select either of the regions obtained by vertically dividing the pixel area 23a into a plurality of regions (e.g., an upper half or a lower half out of the halves obtained by vertically dividing the pixel area 23a). Thus, even in the case (the case in which the projection surface waves sinusoidally) of the projection surface S having a waving shape, for example, the correction can be performed part by part (separately in a convex part and a concave part), and therefore, the linearity of the image can more appropriately be corrected.

Further, although in the present embodiment, the light source section 21 is formed of the discharge light source lamp 21a, it is also possible to use a solid-state light source such as a laser or an LED.

Further, although in the present embodiment, the transparent liquid crystal display system is adopted as the display system of the projector 1, any display principle can be adopted including a reflective liquid crystal display system, a DLP (Digital Light Processing (a registered trade mark) system, and so on. Further, it is also possible to apply the invention to an image display apparatus such as a rear projector integrally provided with a transmissive screen, or a liquid crystal display besides the projector 1.

Further, each of the functions (the processes) of the projector 1 described in the above embodiment can be provided as a program. Further, it is also possible to provide the programs stored in a variety of types of recording media (e.g., a CD-ROM and a flash memory). In other words, the programs for making a computer function as each of the components of the projector 1, and the recording media on which the programs are recorded should be included in the scope of the invention.

Further, besides the embodiment described above, the device configuration, the process, and so on of the projector 1 can arbitrarily be modified within the scope or the spirit of the invention.

What is claimed is:

1. An image display apparatus adapted to display an image modulated by a light modulator on an image display surface, comprising:
 a non-transitory computer-readable medium encoded with a computer program configured to:
 display a test pattern in a display region, the test pattern including a plurality of indexes arranged in one of a horizontal direction and a vertical direction with respect to the display region;
 set at least one of the plurality of indexes as a reference index;
 adjust the intervals of the indexes of the test pattern so as to increase or decrease, as a distance from the reference index increases with respect to the direction of the arrangement of the indexes; and correct linearity of the image based on the adjusted intervals of the indexes.

2. The image display apparatus according to claim 1, wherein the non-transitory computer-readable medium encoded with the computer program is further configured to:

select either one of a horizontal mode of correcting horizontal linearity of the image and a vertical mode of correcting vertical linearity of the image;

display the test pattern including the plurality of indexes arranged horizontally at regular intervals in the display region of the light modulator in a case in which the horizontal mode is selected; and display the test pattern including the plurality of indexes arranged vertically at regular intervals in the display region of the light modulator in a case in which the vertical mode is selected.

3. The image display apparatus according to claim 1, wherein the indexes are each indicated by a linear shape.

4. The image display apparatus according to claim 1, wherein the non-transitory computer-readable medium encoded with the computer program is further configured to:

receive an operation of selecting the reference index out of the plurality of indexes.

5. The image display apparatus according to claim 1, wherein the non-transitory computer-readable medium encoded with the computer program is further configured to:

set the display region of the test pattern in the light modulator; and display the test pattern in the set display region.

6. An image adjustment method of an image display apparatus that displays an image modulated by a light modulator on an image display surface, the method comprising:

displaying a test pattern in a display region, the test pattern including a plurality of indexes arranged in one of a horizontal direction and a vertical direction with respect to the display region;

setting at least one of the plurality of indexes as a reference index;

adjusting the intervals of the indexes of the test pattern so as to increase or decrease, as a distance from the reference index increases with respect to the direction of the arrangement of the indexes; and correcting linearity of the image based on the adjusted intervals of the indexes.

* * * * *